United States Patent
Kinas et al.

(10) Patent No.: US 7,918,551 B2
(45) Date of Patent: Apr. 5, 2011

(54) INK SETS WITH INFRARED BLOCKERS

(75) Inventors: Erick Kinas, Vancouver, WA (US); Charles H McConica, Corvallis, OR (US); Luanne J. Rolly, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 998 days.

(21) Appl. No.: 11/445,807

(22) Filed: Jun. 2, 2006

(65) Prior Publication Data

US 2007/0279468 A1    Dec. 6, 2007

(51) Int. Cl.
*G01D 11/00* (2006.01)
(52) U.S. Cl. .......................................... 347/100; 347/95
(58) Field of Classification Search .................. 347/100, 347/95, 96, 101, 84, 85; 106/31.13, 31.27, 106/31.6; 523/160
See application file for complete search history.

(56) References Cited

U.S. PATENT DOCUMENTS

| | | | |
|---|---|---|---|
| 4,892,584 A * | 1/1990 | Chapman | ...................... 347/100 |
| 5,083,814 A | 1/1992 | Guinta et al. | |
| 5,547,501 A | 8/1996 | Maruyama et al. | |
| 5,569,317 A | 10/1996 | Sarada et al. | |
| 5,766,324 A | 6/1998 | Ikegaya et al. | |
| 5,959,296 A | 9/1999 | Cyr et al. | |
| 5,980,016 A | 11/1999 | Nelson et al. | |
| 6,138,913 A | 10/2000 | Cyr et al. | |
| 6,354,501 B1 | 3/2002 | Outwater et al. | |
| 6,354,502 B1 | 3/2002 | Hagstrom et al. | |
| 6,378,976 B1 | 4/2002 | Byers et al. | |
| 6,770,687 B1 * | 8/2004 | Tan et al. | ...................... 523/161 |
| 2004/0253419 A1 * | 12/2004 | Bleikolm et al. | ......... 106/31.32 |
| 2007/0097193 A1 * | 5/2007 | Ma et al. | ...................... 347/100 |

FOREIGN PATENT DOCUMENTS

| | | |
|---|---|---|
| EP | 1308485 A | 5/2003 |
| WO | 0117784 A | 3/2001 |
| WO | 2006028910 A | 3/2006 |

OTHER PUBLICATIONS

International Search Report for International Application No. PCT/US2007/070230, filing date Jan. 6, 2007.
U.S. Appl. No. 10/279,261, filed Apr. 29, 2004, Iu, Kai Kong et al.

* cited by examiner

*Primary Examiner* — Manish S Shah

(57) ABSTRACT

The present invention is drawn to ink sets, methods of electronically sensing printed images, and ink-jet printing systems. In one embodiment, an ink set for ink-jet printing can include a cyan ink including cyan colorant, a magenta ink including magenta colorant, and a yellow ink including yellow colorant. All three inks of the ink set can include an infrared absorbing dye and have an overlapping infrared absorbance range with respect to one another.

38 Claims, No Drawings

INK SETS WITH INFRARED BLOCKERS

BACKGROUND OF THE INVENTION

Ink-jet printers, such as thermal and piezo ink-jet printers, provide an effective means of propelling inks onto various types of media including plain and coated paper. Specifically, a typical ink-jet printhead has an array of precisely formed nozzles located on a nozzle plate and attached to an ink-jet printhead substrate. The substrate incorporates an array of firing chambers that receive liquid ink (colorants dissolved or dispersed in a solvent) through fluid communication with one or more ink reservoirs. In certain printers, each chamber has a thin-film resistor located opposite the nozzle so ink can collect between the firing resistor and the nozzle. Upon energizing a particular resistor element, a droplet of ink is expelled through the nozzle toward a print medium. Such printers, as typified by the Hewlett-Packard DeskJet™ and DesignJet™ printers, are desirable for use for several reasons.

In general, ink-jet inks are either dye- or pigment-based inks. Dye-based ink-jet inks can use a soluble colorant that is usually water-based to turn the media a specific color. Insoluble dyes have also been used in ink-jet ink formulations, wherein the insoluble dyes are dispersed rather than solubilized in a liquid vehicle. Such insoluble dyes can be considered to be similar to pigmented inks, which typically disperse the colorant within the liquid vehicle. In many cases, the line quality and accuracy of plots produced by insoluble colorant-based inks can be superior to that of water-soluble colorant-based inks. However, color saturation is often superior with water-soluble dye-based ink-jet inks.

No matter what system is used, consumers are demanding reliable printing products with more and more features which can be easily and effectively maintained. Thus, it would be an advancement in the art to provide ink-jet inks, methods, and systems that provide additional value to consumers and reliability to consumers.

DETAILED DESCRIPTION OF THE PREFERRED EMBODIMENT(S)

For the purposes of promoting an understanding of the principles of the invention, reference will now be made to the exemplary embodiments, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

The singular forms "a," "an," and, "the" include plural referents unless the context clearly dictates otherwise. Thus, for example, reference to "a dye" includes reference to one or more of such dyes.

As used herein, "liquid vehicle" is defined to include liquid compositions that can be used to carry colorants and/or infrared dyes to a media substrate. Liquid vehicles are well known in the art, and a wide variety of ink vehicles may be used in accordance with embodiments of the present invention. Such ink vehicles may include a mixture of a variety of different agents, including without limitation, surfactants, solvents, co-solvents, buffers, biocides, viscosity modifiers, sequestering agents, stabilizing agents, and water. The liquid vehicle can also carry other additives such as polymers, UV curable materials, latexes, and/or plasticizers in some embodiments.

An "ink-jet ink" or "ink" comprises an aqueous liquid vehicle and another component that is desirable to be carried to a substrate. Typically, the component is a visible colorant, though colorless inks often include fixer materials, latexes, polymers, and in accordance with embodiments of the present invention, infrared absorbing dyes. If the ink is referred to as "colorless," then it is understood that the ink includes an ink-jettable liquid vehicle without a visible colorant. The general term "ink" refers to "ink-jet inks" when the ink is stated as being used for ink-jet printing.

The term "infrared dye" or "infrared absorbing dye" refers to a certain type of dye that is colorless or pale in color within the visible spectrum when present at a low concentration in a liquid vehicle, e.g., less than 5 wt %, but which has a peak absorbance within the infrared spectrum that is readily detected when illuminated by infrared light. Peak absorbance of such dyes can shift slightly when loaded in some ink compositions, but will still be within the infrared spectrum.

The term "colorant" refers to dyes and pigments that have color within the visible spectrum, e.g., cyan, magenta, yellow, etc. An infrared absorbing dye that imparts little to no color in the visible spectrum is not considered to be a colorant in accordance with embodiments of the present invention.

The term "ink set" refers to inks that are designed or selected to be used together in a common printer. All of the inks present in a common printer can be considered an ink set, or a few inks from a larger group on inks can be considered to be an ink set. For example, most printers have cyan ink (C), magenta ink (M), and yellow ink (Y). An ink set of these three inks (CMY) may be referred to as a "CMY ink set," even if other inks may also be present in a common printer, e.g., black, pale cyan, pale magenta, colorless ink, other colors, etc. Thus, reference to a specific ink set, e.g., "CMY ink set," does not infer that other inks are not present.

The term "peak absorbance" or "peak infrared absorbance" when referring to inks containing infrared dyes or infrared dyes per se, refers to the infrared wavelength where most absorbance occurs. It is noted that "peak absorbance" can be experimentally determined within a few nanometers of wavelength. However, inks containing infrared dyes or infrared dyes per se do not absorb only at their peak infrared absorbance. Typically, a range of absorbance at least 25 nm on either side of peak infrared absorbance is present.

The terms "overlapping absorbance," "overlapping infrared absorbance," or "overlap with respect to infrared absorbance," or the like, refers to a range of wavelengths within the infrared spectrum where two or more inks commonly absorb infrared energy. For example, if a cyan ink absorbs infrared energy at from 800 nm to 900 nm with a peak absorbance at 850 nm, and a yellow ink absorbs infrared energy at from 830 nm to 920 nm with a peak absorbance at 875 nm, then the overlapping absorbance of these two inks is from 830 nm to 900 nm. Thus, an infrared energy source that emits infrared energy from 830 to 900 nm can be used to illuminate both inks. Further, in this example, it may be preferable to use an infrared energy source that emits infrared energy within the range provided by the two respective peak absorbance wavelengths, e.g., from 850 nm to 875 nm in order to generate more intense absorption on average with respect to both inks. More than two inks can also be prepared to have overlapping absorbance wavelengths, e.g., three inks, four inks, five inks, six inks, etc. In one embodiment, certain inks of an ink set, such as a CMY ink set or other ink sub-sets or complete ink sets, can even be formulated to have similar or the same peak absorbance. In this embodiment, which is not required for operability, more optimal results with respect to detecting each of the inks using a single infrared energy source and sensor system may be achieved.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical values, such as ratios, concentrations, amounts, molecular sizes, etc., may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

With these definitions in mind, the present invention is drawn to ink sets, methods of electronically detecting electronic images, and ink-jet printing systems. In one embodiment, an ink set for ink-jet printing can comprise a cyan ink including cyan colorant, a magenta ink including magenta colorant, and a yellow ink including yellow colorant. These three inks of the ink set can include an infrared absorbing dye and have an overlapping infrared absorbance range with respect to one another. Optionally, the cyan ink, the magenta ink, and the yellow ink can be formulated to each absorb infrared energy at least substantially the same as one another when printed at the same drop weight. In another embodiment, the three inks can be formulated to have no more than a 20 nm peak absorption difference within the infrared range when printed at the same drop weight. As it is useful to formulate all three inks to absorb common infrared energy, in one embodiment, the cyan ink, the magenta ink, and the yellow ink can include the identical infrared absorbing dye. Because cyan typically has some absorption within the infrared spectrum, often, cyan can be formulated with less infrared dye than the magenta ink and the yellow ink, though this is not required. If, on the other hand, the goal is to cause all three inks to appear the same to an LED/sensor system, the inks can be formulated to have similar or the same peak infrared absorption, though this is also not required.

Other inks can also be present in the ink set, including black ink, colorless ink, e.g., fixer solutions, polymeric binders, latex overcoats, fusible material, etc., pale cyan ink, pale magenta ink, red ink, orange ink, pink ink, gray ink, green ink, purple ink, etc. These inks can also include an infrared absorbing dye, though with black, this is not typically necessary as black ink has excellent absorption in the infrared spectrum. Further, as black is a good infrared absorber, alignment using the black ink can be carried out by printing black images and color images (with infrared dye present) to conduct an alignment process.

In another embodiment, a method of electronically sensing printed images can comprise printing multiple inks from a CMY ink set onto a media substrate to generate various printed images. Each ink of the CMY ink set can include an infrared absorbing dye such that all three inks of the CMY ink set have an overlapping infrared absorbance range. Additional steps include illuminating the printed images with infrared energy having a wavelength within the overlapping infrared absorbance range, and sensing reflectance or absorbance from the printed images upon illumination with the infrared energy. The same compositional considerations described with respect to the ink set embodiments also apply to this method. Additional method steps can include the step of electronically diagnosing whether or not ink-jet print system maintenance is needed based on information provided by the sensing step. Thus, after the step of electronically diagnosing, a further step of conducting maintenance can be carried out. Exemplary maintenance steps, which will be set forth in more detail below, include conducting a printhead alignment, adjusting an ink drop weight imbalance between multiple colored inks, compensating for a nozzle misfiring or clogging, and/or adjusting a printer setting to compensate for the presence of counterfeit ink.

In another embodiment, an ink-jet printing system can comprise a CMY ink set where all three inks of the ink set include an infrared absorbing dye and have an overlapping infrared absorbance range with respect to one another; an infrared illuminating device configured to emit infrared energy having a wavelength within the overlapping infrared absorbance range; and an infrared sensing device configured to sense reflectance or absorbance from the cyan ink, the magenta ink, and the yellow ink once printed on a media substrate. In one embodiment, the system can include the media substrate. Again, the same compositional considerations described with respect to the ink set embodiments also apply to this system.

In more detail with respect to certain embodiments described herein, it has been discovered that certain dyes that are substantially transparent in the visible spectrum, particularly at low concentrations in a liquid vehicle, e.g., less than 5 wt %, but that block or absorb infrared (IR) energy, such as near infrared (NIR) energy, mid infrared (MIR) energy, or far infrared (FIR) energy, can be useful for various ink-jet printing and diagnostic purposes as described herein. When inks containing such dyes are printed on paper or another media substrate, the presence of these types of dyes can be substantially invisible on the printed media, but can be detected upon illumination using infrared energy within the absorbance range of the respective inks.

Exemplary infrared energy sources that can be used include infrared light emitting diodes (LEDs). Such devices can be optically coupled (by reflection from a substrate) to a sensor capable of detecting absorbance/reflectance in response to illumination by the LED. Suitable LED devices that can be used include those which emit electromagnetic light energy within the infrared spectrum. If the dye selected is has a peak absorbance within the near infrared spectrum, then an LED that emits light energy within the near infrared spectrum can be used. The matching principle is generally true for mid-infrared energy or far infrared energy as well. In one embodiment, at least approximate matching between the emitted electromagnetic energy and the peak absorbance of the infrared dye can be beneficial, e.g., peak absorbance of the dye within 50 nm of the infrared light energy emitted from the LED.

Suitable optical sensor systems that can be used can be purchased from Hewlett-Packard Company, e.g., Part No. C3195-60002 or Part No. C5302-60014, each of which can be modified by replacing the included non-infrared LED with a suitable infrared LED. The former part is provided commercially with the HP DesignJet 755 ink-jet plotter. The latter part is provided commercially with the HP Color Copier 210 machine. These systems are typically carriage based sensors which utilize a non-infrared LED and a diffuse sensor. As stated, these parts can be readily modified by using an infrared LED sensor in accordance with embodiments of the present invention. In addition, U.S. Pat. Nos. 6,325,505 and 6,322,192, which are incorporated herein by reference, also describe suitable optical sensor systems that can be modified with an infrared LED.

To illustrate an embodiment of the present invention, consideration of the near infrared (NIR) range is exemplary, though it is understood that similar principles will be true for mid infrared (MIR) and far infrared (FIR) dyes. By adding an amount of NIR dye sufficient for detection within various colored inks using an NIR LED, a method of detection of the ink that is independent of the ink color, and works equally well across major colors of the visible spectrum can be provided, as the NIR dye absorbs outside of the visible spectrum. The concentration of dye in such colored inks can vary greatly, depending on the desired application or use. For example, the NIR dye (or other IR dye) can be present at from 0.01 wt % to 4 wt %. Often, it can be desirable to select concentrations on the lower end of this range, e.g., from 0.01 wt % to 0.5 wt %, as lower visibility in the visible spectrum can be achieved (if the NIR dye has some pale color), and such dyes can often be added to existing inks with little need for reformulating or compensating for the presence of these dyes. The amount added to colored inks can also depend to some degree on the extinction coefficient for the particular IR dye selected for use. If the NIR dye is added at a concentration that is "visible" to an NIR LED and sensor system present on a printer, and the cyan, magenta, and yellow inks all have a common or similarly absorbing NIR dye included therein, this will allow the printer to be able to use one low cost NIR LED to illuminate all of the inks similarly.

A system which includes an infrared energy source and associated sensor with inks that include these NIR dyes in a common ink set can be used to cost effectively add value to a customer. For example, the printer may be configured to be able to align all of the jetting architectures relative to the black printing architecture (as black already absorbs in the infrared range). In past systems, in order for a light energy source and sensor to "see" all of the colors, expensive LED devices were used. Even with these more sophisticated LEDs, there were still trade-offs in choosing the correct LED. Further, there had been difficulty when using low colorant loads, which rendered the ink difficult or impossible to see with a light and sensor system. For example, if a blue LED is used, alignment for magenta and yellow inks is acceptable. However, the cyan response with a blue LED is very weak, and thus, cyan alignment may suffer too much variation for precise alignment.

When using these types of dyes and associated infrared illuminating and sensing systems, printers can be designed to verify that all of nozzles are ejecting ink, and optionally, replace misfiring or missing nozzles with good nozzles or prompt a user for a cleaning the nozzles.

In another embodiment, with the same effective infrared absorbance from one ink to another within a common ink set (which can include similar amounts of NIR dye in each of the colored inks), the printer is able to determine relative drop weight between colors as well as high and low drop weight architectures or pens. This feature permits drop weight compensation in the printer which will improve image quality. For example, if the color balance between CMY or other inks if off, hue-shifts due to unbalanced drop weights can result. In other words, the printer can calibrate the relative drop weight difference between each color based on infrared absorbance and compensate the inks accordingly so that all of the pens fire the correct amount of ink. This is not possible in many current systems, as the printer must know exactly the LED wavelength (as they vary slightly), and must further know the response of a color at that wavelength. In these systems, in order to try and calibrate two colors with one LED, the LED is typically chosen at a spot where both colors absorb some light. At this location, a small change in LED wavelength greatly affects the absorption. Additionally, with a dual drop weight pen, there is a need to calibrate the relative drop weight of both the high and low drop weights. By adding an infrared dye to each color in the ink set, the printer can then calibrate the relative difference in drop weight between the high and low drop weight pens. This process can be carried out by printing a fill image, e.g., a square or other shape, at the low drop weight, and fill images at the high drop weight depleted to different levels. By doing this, the sensor can find the correct depletion to match the original low drop weight pen. For relative drop weight differences, prior solutions included the use of a calorimeter which adds a lot of cost, or a manual color calibration which is not always acceptable and sometimes results in poor color quality.

The presence of these dyes can also allow the printer to check for counterfeit inks, and optionally, provide a message to the customer or provide some other reporting function. In addition to informing the customer, the printers can be designed to make appropriate changes to accommodate these inks. For example, such a change can be used to modify the servicing profiles to improve counterfeit ink reliability, or change the printing profile for that of a specific known ink to a more general printing profile for that of an unknown ink.

Turning to other ink components that can be used, the use of visible colorants is included in accordance with embodiments of the present invention. If a dye is used, almost any water-soluble acid dye(s), direct dye(s), basic dye(s), and reactive dye(s) can be used, such as those described in the Color Index. Dyes not described in the Color Index can also be used as well. Dyes can also be used that have low solubility or essentially no solubility in water or in a liquid vehicle, such as dye lakes and other known insoluble dyes. The dyes that can be used include metallized dyes and/or non-metallized dyes, depending on the specific application. If a pigment is used, any pigment colorant that is functional in accordance with embodiments of the present invention can be used. Types of pigments that can be used include self-dispersed pigments that include attached or adsorbed small molecules or polymers; pigments that required a separate polymer or other dispersing agent; etc. It is not the purpose of the invention to describe each and every colorant or type of colorant that can be used. Any colorant or combination of colorants that impart(s) a desired color property can be used in conjunction with the infrared dyes of the present invention.

With respect to the liquid vehicle, the ink-jet ink compositions of the present invention are typically prepared in an aqueous formulation or liquid vehicle which can include water, co-solvents, surfactants, buffering agents, biocides, sequestering agents, viscosity modifiers, humectants, and/or other known additives. In one aspect of the present invention, the liquid vehicle can comprise from about 70 wt % to about 99.9 wt % by weight of the ink-jet ink composition. In another aspect, other than the colorant, liquid vehicle can also carry polymeric binders, latex particulates, and/or other solids.

Suitable co-solvents for use in the present invention include water soluble organic co-solvents, but are not limited to alcohols, ethers, thiols, ketones, aldehydes, carboxylates, amides, and amines. More specifically, exemplary co-solvents that can be used include aliphatic alcohols, aromatic alcohols, polyhydric alcohols such as diols and triols, glycol ethers, poly(glycol) ethers, lactams, formamides, acetamides, long chain alcohols, ethylene glycol, propylene glycol, diethylene glycols, triethylene glycols, glycerine, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones.

For example, co-solvents can include primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly (propylene glycol) alkyl ethers, substituted formamides, unsubstituted formamides, substituted acetamides, and unsubstituted acetamides. More specific examples of co-solvents that can be used include, but are not limited to, 1,5-pentanediol, 2-pyrrolidone, 2-ethyl-2-hydroxymethyl-1,3-propanediol, diethylene glycol, 3-methoxybutanol, and 1,3-dimethyl-2-imidazolidinone. Co-solvents can be added to reduce the rate of evaporation of water in the ink-jet to minimize clogging or other properties of the ink such as viscosity, pH, surface tension, optical density, and print quality. The total co-solvent concentration can range from about 0.01 wt % to about 40 wt %. In one embodiment, the total co-solvent concentration can be from about 5 wt % to about 20 wt %, and in another, the total concentration can be from 10 wt % to 40 wt %.

In one embodiment, the ink-jet ink and method of the present invention can include the use of from 0.5 wt % to 8 wt % of an inorganic or organic salt. Non-limiting examples of such salts that can be used include $Mg^{2+}(NO_3)_2^{2-}$, $Li^+NO_3^-$, $K^+NO_3^-$, $Na^+CH_3SO_3^-$, $Na^+NO_3^-$, and/or $Mg^{2+}(CH_3SO_3)_2^{2-}$. Through each salt is described alone above, it is understood that each of these specific salt descriptions covers its respective hydrated salt structures as well. For example, $Mg^{2+}(NO_3)_2^{2-}$ would include $Mg^{2+}(NO_3)_2^{2-} \cdot 6H_2O$. Thus, salted inks can be printed against other inks, such as pigmented inks, to reduce bleed, as is known in the art.

Various buffering agents or pH adjusting agents can also be optionally used in the ink-jet ink compositions of the present invention. Typical buffering agents include such pH control solutions as hydroxides of alkali metals and amines, such as lithium hydroxide, sodium hydroxide, potassium hydroxide; citric acid; amines such as triethanolamine, diethanolamine, and dimethylethanolamine; hydrochloric acid; and other basic or acidic components which do not substantially interfere with the bleed control or optical density characteristics of the present invention. If used, buffering agents typically comprise less than about 10 wt % of the ink-jet ink composition.

In another aspect of the present invention, various biocides can be used to inhibit growth of undesirable microorganisms. Several non-limiting examples of suitable biocides include benzoate salts, sorbate salts, commercial products such as NUOSEPT (Nudex, Inc., a division of Huls America), UCARCIDE (Union Carbide), VANCIDE (RT Vanderbilt Co.), and PROXEL (ICI Americas) and other known biocides. Typically, such biocides comprise less than about 5 wt % of the ink-jet ink composition and often from about 0.1 wt % to about 0.25 wt %.

One or more of various surfactants can also be used as are known by those skilled in the art of ink formulation. Non-limiting examples of suitable surfactants include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, commercial products such as TERGITOLS, SURFYNOLS, ZONYLS, TRITONS, MERPOLS, and combinations thereof. The amount of surfactant added to the ink-jet ink, if any, can range from 0 wt % to 10 wt %.

In one embodiment of the present invention, the ink-jet ink can be configured for application from a thermal ink-jet pen. Thermal ink-jet systems are quite different in their jetting properties than piezo ink-jet systems. As such, compositions that are effective for use in piezo ink-jet systems are not necessarily effective for use with thermal ink-jet ink systems. However, the converse is not necessarily true. In other words, compounds that work well with thermal ink-jet systems are more likely to work with piezo systems than vice versa. Therefore, the selection of liquid vehicle or other additives for use with thermal ink-jet systems often requires more care, as thermal ink-jet systems are typically less forgiving than piezo ink-jet systems.

In addition to plain paper, the ink-jet inks of the present invention are particularly useful when printing of so-called "photo media," such as media having an ink-receiving layer coated thereon. When referring to the ink-receiving layer of a print medium, this can include any coating that is used to accept an ink-jet ink to produce an image.

The following example illustrates embodiments of the invention that are presently best known. However, it is to be understood that the following is only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following examples provide further detail in connection with what is presently deemed to be the most practical and preferred embodiment of the invention.

EXAMPLES

The following examples illustrate embodiments of the invention that are presently best known. However, other embodiments can be practiced that are also within the scope of the present invention.

Example 1

Three test ink compositions (without colorant) were prepared, each having the same vehicle components and relative amounts of components, except that each contained a different concentration of a near infrared (NIR) dye, i.e., 4 wt %, 1 wt %, and 0.1 wt %. Each dye concentration was placed in a different chamber of an ink-jet printer. The printer was fitted with an 850 nm LED having a spot sensor with a peak response of about 870 nm. The peak response for the NIR dye was about 820 nm. It was verified that the 850 nm LED allowed the printer to carry out all of the normal media sensing functionality that was typical for this printer, i.e. top of form and media sense.

In addition to the normal functionality of media sensing, the 850 nm LED was used to illuminate each of the three inks after being printed on a media substrate. All three dye concentrations had a sufficient amount of the NIR dye for the LED and sensor system to "see" the inks. It is noted that though all of the tested concentrations are acceptable for use, there is typically a bias for using a lower amount of such an additive (NIR dye) to reduce the possibility of ink formulation complications. Thus, once it was established that all three NIR dye concentrations were readily sensed by the LED and sensor system, additional testing was conducted using the ink with the 0.1 wt % dye concentration. It should be emphasized that this bias in no way limits the present invention, as NIR dye in this example works acceptable well at each of the tested concentrations.

Example 2

The test ink composition (without colorant) containing 0.1 wt % NIR dye was printed on a media substrate in depleted patterns to mimic even lower dye concentrations. Using such depleted pattern, it was discovered that a 30% fill provided a desirable compromise between i) measurability with an 850 nm LED/spot sensor and ii) invisibility when printed on plain paper. This being stated, it should be noted that lower fill levels can also provide acceptable results, and further, by using an 820 nm LED rather than an 850 nm LED in this example, more absorbance would occur, allowing for even lower concentrations of NIR dye.

The first test was conducted by mimicking alignment page patterns that are typically printed to test ink-jet alignment on media. For this test, a series of bars across the page were printed and then scanned with a Carriage based sensor using the 850 nm LED to illuminate the ink. This sensor had a 9 bit A/D converter which gave 512 counts (where a signal around 512 is equal to white paper—the lower the AND count, the darker the response). In conducting this test, the biggest dip in signal came from the 0.1 wt % dye concentration ink with no depletion. From this test, it was determined that good printer alignment could be achieved with ink fill down to about 30%, whereas a 10% fill exhibited fairly poor signal to noise ratio.

Human visibility testing was also conducted where squares were printed using the ink with 0.1 wt % NIR dye load. Ink fill was printed at 100%, 50%, 30%, and 10%. The spectral reflectance of each square was measured on a Gretag Spectrolino. These values were compared to plain paper. The least amount of absorbance was present at the 10% fill level. The other fill levels (100%, 50%, and 30%) were also acceptable, though the lower the fill level, the lower the absorbance.

Thus, based on these two tests, it was ascertained that a very small concentration of infrared dye can be added to an ink and be invisible or almost invisible to the human eye, which still can be seen by an IR LED/sensor system. It is noted that whether or not the infrared dye used is totally invisible or faintly visible to the human eye is less significant when these dyes are included in colorant-containing ink-jet inks, and further, if there is a minor color change, these inks can be balanced for appropriate color properties with the infrared dye present.

Example 3

Cyan Ink-Jet Ink

Table 1a below sets forth an exemplary liquid vehicle; Table 1b sets forth exemplary dye concentrations; and Table 1c sets forth exemplary ink characteristics for a cyan ink prepared in accordance with embodiments of the present invention, as follows:

TABLE 1a

| Vehicle Components | Wt % |
|---|---|
| trimethylolpropane | 7.5 |
| 2-pyrrolidone | 6.5 |
| 1,5-pentanediol | 8 |
| Tergitol 15-S-5 | 1 |
| Tergitol 15-S-7 | 1 |
| MES (acid form) | 0.2 |
| Dowfax 8390 | 0.4 |
| EDTA disodium salt dihydrate | 0.2 |
| magnesium nitrate hexahydrate | 3 |
| Water | balance |

TABLE 1b

| Dyes | Supplier | Absorbance | λ Max (nm) | Dye Load (wt %) |
|---|---|---|---|---|
| Copper Phthalocyanine | Avecia | 0.384 | 618 | 4 |
| SDA4927 | H.W. Sands | — | 822 (reported) | 0.1 to 4 |

TABLE 1c

| Ink Physicals | |
|---|---|
| pH | 6.2-6.8 |
| Surface tension (dynes/cm) | 27-33 |
| Viscosity (cP) | 2.8-3.4 |

Example 4

Magenta Ink-Jet Ink

Table 2a below sets forth an exemplary liquid vehicle; Table 2b sets forth exemplary dye concentrations; and Table 2c sets forth exemplary ink characteristics for a magenta ink prepared in accordance with embodiments of the present invention, as follows:

TABLE 2a

| Vehicle Components | Wt % |
|---|---|
| trimethylolpropane | 7.5 |
| 2-pyrrolidone | 6.5 |
| 1,5-pentanediol | 8 |
| Tergitol 15-S-5 | 1 |
| Tergitol 15-S-7 | 1 |
| MES (acid form) | 0.2 |
| Dowfax 8390 | 0.4 |
| EDTA disodium salt dihydrate | 0.2 |
| magnesium nitrate hexahydrate | 3 |
| Water | balance |

TABLE 2b

| Dyes | Supplier | Absorbance | λ Max (nm) | Dye Load (wt %) |
|---|---|---|---|---|
| S700 Na | Avecia | 0.26 | 532 | 4.3 |
| Acid Red 52 Na | Sensient | 0.26 | 566 | 0.8 |
| SDA4927 | H.W. Sands | — | 822 (reported) | 0.1 to 4 |

TABLE 2c

| Ink Physicals | |
| --- | --- |
| pH | 6.2-6.8 |
| Surface tension (dynes/cm) | 27-33 |
| Viscosity (cP) | 2.8-3.4 |

Example 5

Yellow Ink-Jet Ink

Table 3a below sets forth an exemplary liquid vehicle; Table 3b sets forth exemplary dye concentrations; and Table 3c sets forth exemplary ink characteristics for a yellow ink prepared in accordance with embodiments of the present invention, as follows:

TABLE 3a

| Vehicle Components | Wt % |
| --- | --- |
| trimethylolpropane | 7.5 |
| 2-pyrrolidone | 6.5 |
| 1,5-pentanediol | 8 |
| Tergitol 15-S-5 | 1 |
| Tergitol 15-S-7 | 1 |
| MES sodium salt | 0.2 |
| Dowfax 8390 | 0.4 |
| EDTA disodium salt dihydrate | 0.0075 |
| magnesium nitrate hexahydrate | 3 |
| water | balance |

TABLE 3b

| Dyes | Supplier | Absorbance | λ Max (nm) | Dye Load (wt %) |
| --- | --- | --- | --- | --- |
| Y1189 Na | ILford | 0.35 | 394 | 5.08 |
| AY 17 Na | Sensient | 0.05 | 402 | 0.56 |
| SDA4927 | H.W. Sands | — | 822 (reported) | 0.01 to 4 |

TABLE 3c

| Ink Physicals | |
| --- | --- |
| pH | 6.2-6.8 |
| Surface tension (dynes/cm) | 27-33 |
| Viscosity (cP) | 3.0-3.6 |

Example 6

Each of the inks described in Examples 3-5 above can be modified to include a different infrared dye (other than the SDA4927 shown in the Examples above). Table 4 sets forth the SDA4927 dye as well as other dyes that can be used in accordance with embodiments of the present invention.

TABLE 4

| Dye | [1]Reported $\lambda_{max}$ nm | [2]Measured $\lambda_{max}$ nm (in ink) | [1]Reported ε L/mol-cm | [2]Measured ε L/gm-cm |
| --- | --- | --- | --- | --- |
| SDA4927 | 822 | 835 | 240,000 | 270 |
| SDA6122 | 868 | 880 | 214,000 | 180 |
| SDA6211 | 901 | 915 | 210,000 | 110 |
| SDA8700 | 844 | 860 | 300,000 | 229 |

TABLE 4-continued

| Dye | [1]Reported $\lambda_{max}$ nm | [2]Measured $\lambda_{max}$ nm (in ink) | [1]Reported ε L/mol-cm | [2]Measured ε L/gm-cm |
| --- | --- | --- | --- | --- |
| SDA8737 | 910 | 920 | 216,000 | 18 |
| SDA9600 | 960 | — | — | — |

[1]"Reported $\lambda_{max}$" and "Reported ε" describe those values reported by the manufacturer. With respect to Reported $\lambda_{max}$, it is noted that peak wavelength is related to maximum absorbance. A range of absorbance will exist for each dye surrounding the peak wavelength absorbance, e.g., typically\y at least 25 nm on either side of the peak absorbance.
[2]"Measured $\lambda_{max}$" and "Measured ε" are based on the approximate measured values when present in the ink-jet inks described in Examples 3-5. With respect to Measured $\lambda_{max}$, the numbers are slightly different than reported values because of the nature and/or interaction with ink components.

It is noted that in the above Examples, various concentrations of infrared dyes can be used in accordance with embodiments of the present invention. For example, magenta colorants and yellow colorants typically do not absorb in the infrared range. On the other hand, cyan colorants have some absorbance in the infrared range. Thus, when formulating an ink set, often, less infrared dye may need to be used in a cyan ink compared to a yellow ink or a magenta ink, if goal is to create an ink set where all of the inks are illuminated and sensed similarly by an LED/spot sensor system, i.e. all inks appear the same or similar to the spot sensor when illuminated in the same manner. Balancing of color properties of each of these inks would be apparent to one skilled in the art after considering the present disclosure. For example, the cyan ink of Example 3 may be formulated to have 0.04 wt % of the IR dye, whereas the magenta ink and the yellow ink may be formulated to have 0.05 wt % of the same IR dye.

While the invention has been described with reference to certain preferred embodiments, those skilled in the art will appreciate that various modifications, changes, omissions, and substitutions can be made without departing from the spirit of the invention. For example, though specific minor amounts of additives are shown in the Examples, other additives or fewer additives can also be used. It is intended, therefore, that the invention be limited only by the scope of the following claims.

What is claimed is:

1. An ink set for ink-jet printing, comprising a cyan ink including cyan colorant, a magenta ink including magenta colorant, and a yellow ink including yellow colorant, wherein all three inks of the ink set include a near infrared absorbing dye that absorbs outside the visible spectrum and is different from the colorants, and wherein all three inks collectively have an overlapping infrared absorbance range.

2. An ink set as in claim 1, wherein the cyan ink, the magenta ink, and the yellow ink each have substantially the same absorbance at a given wavelength when printed at the same drop weight.

3. An ink set as in claim 1, wherein the cyan ink, the magenta ink, and the yellow has no more than a 20 nm peak absorption difference within the infrared range when printed at the same drop weight.

4. An ink set as in claim 1, wherein the cyan ink, the magenta ink, and the yellow ink include the identical near infrared absorbing dye.

5. An ink set as in claim 4, wherein the near infrared absorbing dye is present at a first concentration in the cyan ink, a second concentration in the magenta ink, and a third concentration in the yellow ink, wherein the first concentration is different than the second concentration or the third concentration.

6. An ink set as in claim 5, wherein the first concentration is less than the second concentration and the third concentration.

7. An ink set as in claim 1, further comprising a black ink.

8. An ink set as in claim 1, further comprising a colorless ink which also includes a near infrared absorbing dye.

9. An ink set as in claim 1, further comprising a pale cyan ink including cyan colorant, and a pale magenta ink including magenta colorant, each of the pale cyan ink and the pale magenta ink also including a near infrared absorbing dye.

10. An ink set as in claim 1, wherein the cyan colorant, the magenta colorant, and the yellow colorant are pigments.

11. An ink set as in claim 1, wherein the cyan colorant, the magenta colorant, and the yellow colorant are dyes.

12. A method of electronically sensing printed images, comprising:
   printing multiple inks from a CMY ink set onto a media substrate to generate various printed images, the CMY ink set comprising the ink set of claim 1;
   illuminating the printed images with infrared energy having a wavelength within the overlapping infrared absorbance range; and
   sensing reflectance or absorbance from the printed images upon illumination with the infrared energy.

13. A method as in claim 12, wherein the near infrared absorbing dye is the same dye in each of the cyan ink, the magenta ink, and the yellow ink.

14. A method as in claim 12, wherein the cyan ink, the magenta ink, and the yellow ink each have substantially the same absorbance at a given wavelength when printed at the same drop weight.

15. A method as in claim 12, wherein the cyan ink, the magenta ink, and the yellow has no more than a 20 nm peak absorption difference within the infrared range when printed at the same drop weight.

16. A method as in claim 12, wherein the cyan ink has a lower concentration of near infrared absorbing dye than at least one of the magenta ink and the yellow ink.

17. A method as in claim 12, wherein the overlapping infrared absorbance range is within the near infrared spectrum.

18. A method as in claim 12, further comprising the step of electronically diagnosing whether or not ink-jet system maintenance is needed based on information provided by the sensing step.

19. A method as in claim 18, wherein after the step of electronically diagnosing, a further step of conducting system maintenance occurs.

20. A method as in claim 19, wherein the system maintenance includes conducting a printhead alignment.

21. A method as in claim 19, wherein the system maintenance includes adjusting an ink drop weight imbalance between multiple colored inks.

22. A method as in claim 19, wherein the system maintenance includes compensating for an architecture nozzle misfiring or clogging.

23. A method as in claim 19, wherein the system maintenance includes adjusting a printer setting to compensate for counterfeit ink.

24. A method as in claim 19, wherein the CMY ink set is a sub-set of an ink set that includes at least one of a black, pale cyan, pale magenta, or colorless ink.

25. An ink-jet printing system, comprising:
   a CMY ink set comprising the ink set of claim 1;
   an infrared illuminating device configured to emit infrared energy having a wavelength within the overlapping infrared absorbance range; and
   an infrared sensing device configured to sense reflectance or absorbance from the cyan ink, the magenta ink, and the yellow ink once printed on a media substrate.

26. A system as in claim 25, further comprising a media substrate.

27. A system as in claim 25, wherein the near infrared absorbing dye is the same dye in each of the cyan ink, the magenta ink, and the yellow ink.

28. A system as in claim 25, wherein the cyan ink, the magenta ink, and the yellow ink each have substantially the same absorbance at a given wavelength when printed at the same drop weight.

29. A system as in claim 25, wherein the cyan ink has a lower concentration of near infrared absorbing dye than at least one of the magenta ink and the yellow ink.

30. A system as in claim 25, wherein the overlapping infrared absorbance range is within the near infrared spectrum.

31. A system as in claim 25, wherein the CMY ink set is a sub-set of an ink set that includes at least one of a black, pale cyan, pale magenta, or colorless ink.

32. A system as in claim 25, wherein the infrared illuminating device is an LED.

33. A system as in claim 32, wherein the LED is a near infrared LED.

34. A system as in claim 25, wherein the infrared sensing device is a carriage based diffuse sensor.

35. An ink set for ink-jet printing, comprising
   a pale cyan ink including cyan colorant;
   a pale magenta ink including magenta colorant;
   a cyan ink including cyan colorant;
   a magenta ink including magenta colorant; and
   a yellow ink including yellow colorant,
   wherein all inks of the ink set include a near infrared absorbing dye that absorbs outside the visible spectrum and is different from the colorants, and wherein the cyan ink, the magenta ink, and the yellow ink collectively have an overlapping infrared absorbance range.

36. An ink set as in claim 35, further comprising a colorless ink which also includes a near infrared absorbing dye.

37. An ink set as in claim 35, wherein the cyan ink, the magenta ink, and the yellow ink have no more than a 20 nm peak absorption difference within the infrared range when printed at the same drop weight.

38. An ink set as in claim 35, wherein the pale cyan ink and the pale magenta ink also have an overlapping infrared absorbance range with the cyan ink, the magenta ink, and the yellow ink.

* * * * *